US007234909B2

(12) United States Patent
Jonkka

(10) Patent No.: US 7,234,909 B2
(45) Date of Patent: Jun. 26, 2007

(54) APPARATUS FOR STORAGE AND UNLOADING OF GRANULAR MATERIAL

(75) Inventor: Arvo Jonkka, Pori (FI)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 11/505,880

(22) Filed: Aug. 18, 2006

(65) Prior Publication Data

US 2006/0285943 A1 Dec. 21, 2006

Related U.S. Application Data

(62) Division of application No. 10/518,456, filed as application No. PCT/FI03/000058 on Jan. 24, 2003.

(51) Int. Cl.
*B65G 1/00* (2006.01)

(52) U.S. Cl. ...................... 414/302; 414/310; 414/326; 198/519; 198/671; 198/861.4

(58) Field of Classification Search ................ 414/298, 414/299, 300, 301, 302, 306, 310, 326; 198/317, 198/318, 511, 519, 671, 861.4
See application file for complete search history.

(56) References Cited

U.S. PATENT DOCUMENTS 2,649,215 A 8/1953 Dickson
2,790,563 A 4/1957 McCarthy
3,438,517 A 4/1969 Steffen
3,487,961 A 1/1970 Neuenschwander
3,526,328 A 9/1970 Garret et al.
3,557,979 A 1/1971 Zortman
3,661,283 A 5/1972 Fischer et al.
3,713,552 A 1/1973 Schnyder
3,765,548 A 10/1973 Shivvers
3,847,289 A 11/1974 Fischer
4,154,332 A 5/1979 Schlegel
4,217,701 A 8/1980 Mathews
4,286,909 A 9/1981 Tingskog
4,322,021 A 3/1982 Olsson
4,401,404 A 8/1983 Weaver
4,451,192 A 5/1984 Wood
4,492,302 A 1/1985 Svens (Continued)

FOREIGN PATENT DOCUMENTS

SE 516 935 C2 12/2000

(Continued)

*Primary Examiner*—Joe Dillon, Jr.
(74) *Attorney, Agent, or Firm*—Buchanan Ingersoll & Rooney PC

(57) ABSTRACT

The object of the invention is an apparatus for storage of wood chips in a curved-top stockpile the apparatus consisting of a central tower, which supports a conveyor for loading the chips and a beam-like turning pile composer, and a unloading beam supported on ground level on the lower part of the tower as well as on supporting wheels and furnished with unloading devices for transporting the wood chips towards the center of the apparatus. The central tower is furnished at one side with a tubular ex-central opening, and the tower occupies a central tube for delivering the wood chips either upwards or downwards from the opening. The unload drive for the unloading device is positioned inside the tower and the stockpile yard is furnished with a wall at the reach of the unloading device.

7 Claims, 6 Drawing Sheets

U.S. PATENT DOCUMENTS

| | | | |
|---|---|---|---|
| 4,537,553 | A | 8/1985 | Andersson |
| 4,721,425 | A | 1/1988 | Strocker |
| 4,775,278 | A | 10/1988 | Fischer et al. |
| 5,098,247 | A | 3/1992 | Campbell |
| 5,180,272 | A | 1/1993 | Campbell |
| 5,366,067 | A | 11/1994 | Courtois et al. |
| 5,722,529 | A | 3/1998 | Manjunath et al. |
| 5,845,762 | A | 12/1998 | Stark |
| 6,203,261 | B1 | 3/2001 | South et al. |
| 6,254,329 | B1 | 7/2001 | Sukup et al. |
| 6,676,357 | B2 | 1/2004 | Stafford et al. |

FOREIGN PATENT DOCUMENTS

| | | |
|---|---|---|
| WO | WO 00/75053 A1 | 12/2000 |

APPARATUS FOR STORAGE AND UNLOADING OF GRANULAR MATERIAL

This application is a divisional application of pending U.S. patent application Ser. No. 10/518,456 filed on 22 Dec. 2004 as a national phase application of International Application No. PCT/FI2003/000058 filed on Jan. 24, 2003.

The invention relates to an apparatus for storage of wood chips in an open-yard or silo storage as a conical or curved-top stockpile and, respectively, for unloading material from this type of stockpile. While the invention is particularly advantageously related to the storage of wood chips, it is also suited for use in the storage of other granular material such as bark, coal, grain and the like.

It is known to store chips in stockpiles by a method wherein chips are stacked in a curved-top pile having typically a diameter of 80 to 150 m and a height of 20 to 30 m. In these methods, green chips are stacked at one end of the stockpile while earlier stored chips are unloaded from the other end. By virtue of this method, the storage time of chips can be kept optimal in regard to the later processing steps inasmuch the stockpile is always unloaded at the end containing the longest stored chips.

In conventionally used chip storage facilities meeting the above requirements, green chips are transported over the top level of the stockpile by means of a belt conveyor, adapted to operate in a conveyor bridge, to the upper portion of a tower-like structure located in the center of the curved-top stockpile. Below the conveyor bridge, on the top portion of the tower structure is supported a horizontally rotatable boom. Chips are dropped via a hopper onto a belt conveyor adapted into the boom which in this manner creates a curved stockpile around the tower. The top of the stockpile is kept on loading at a constant height with the help of an automatic level sensor. The chips are unloaded from the stockpile by means of a horizontally on ground level rotated reclaim conveyor bridge that houses a reclaim conveyor and is connected to the lower portion of the tower by its one end. To the distal end of the reclaim conveyor bridge are mounted driven wheels that run on the storage yard along a track encircling the stockpile. As known in the art, the reclaim conveyor may be a drag conveyor or, alternatively, an auger conveyor equipped with one or more augers. To the reclaim conveyor bridge is further adapted a rake-like lattice which is adapted to move reciprocatingly driven in the direction of the reclaim conveyor bridge so as to collapse the stockpile onto the reclaim conveyor. The reclaim conveyor bridge has in a reclaim system of this type a length of 40 to 70 m, and is consequently quite heavy, having completely equipped a weight of 50 to 100 tons.

The reclaim conveyor transfers chips into an open hopper located in the foot of the tower, conventionally embedded in the foundation construction, and forming a circulating ring around the tower, from which hopper the chips fall onto a conveyor located beneath the chip storage, and delivering the chips from the storage area. As a security issue it is to be noted that this kind of open hopper is not well suited for the purpose because besides the chips, also other items may fall into it, including operating personnel, animals and other non-intended obstacles.

Curved-top pile storages for chips are also known where the chips are reclaimed from the surface of the pile, and transported further from the ground level. Said storage system is, however, not very suited for utilizing an optimized storage time, because the stationary transport conveyor cuts the pile constantly at a same location.

As a controlled unloading capacity is required from the apparatus of the invention, the machinery turning the heavy unloading bridge must be controlled and furnished with a control drive of its own. Similarly the unloading auger in the bridge must be furnished with a controlled drive of its own or even in some cases with two drives. The transportation conveyor delivering the chips further from the unloading bridge has its own operation requirements. The apparatus of the invention is to be continuously operating, and longer service stops are not allowed, and especially a situation where the storage becomes empty, is totally excluded. This means that the robust machinery parts are to be quite easily and quickly to be serviced, and the service personnel must have access to the locations requiring inspection and service.

The essential characterizing features of an apparatus implementing the the invention are disclosed in appended claims.

Next, the invention will be examined in greater detail by making reference to the appended drawings, wherein FIG. 1 is a side view of an apparatus stacking and unloading a curved-top stockpile according to a conventional procedure;

FIG. 2 is a side view of a storage apparatus according to the invention stacking and unloading a curved-top stockpile;

FIG. 3 discloses an intermediate support for the unloading bridge;

Figure 1:
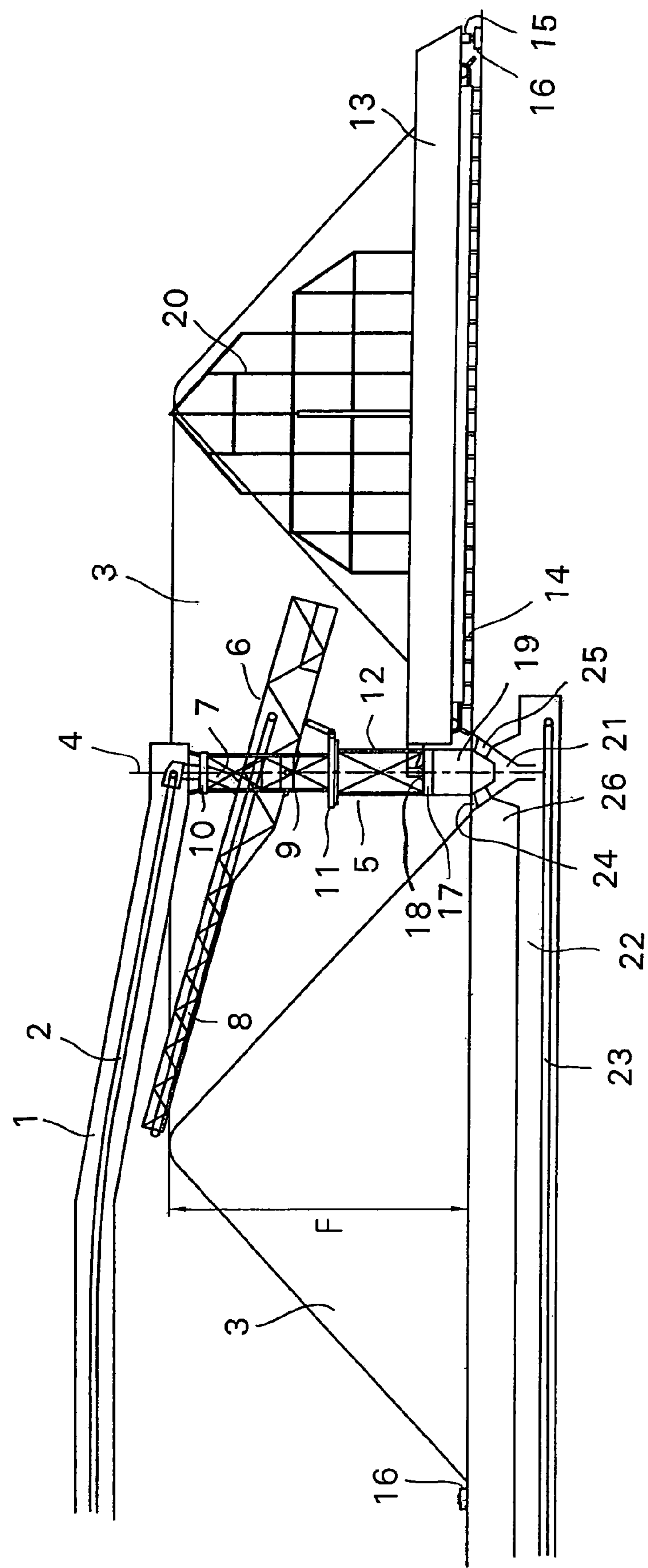

Referring to FIG. 1, therein is illustrated a prior system stacking and unloading a curved-top stockpile. Chips are transported by means of a conveyor 2, conventionally a belt conveyor, adapted to operate in a conveyor bridge 1, into a tower-like central structure 5 located to the center of a curved-top stockpile 3. Below the conveyor bridge 1, on the upper portion of the central tower 5 is supported a stacking boom 6 capable of rotating horizontally about the center 4 of the tower. Chips are passed via a hopper 7 onto a belt conveyor 8 operating in the interior of the stacking boom such that a stockpile 3 essentially surrounding the central tower is created. The stacking boom 6 is connected to the boom support portion 9 of the tower that is mounted in bearing 10 on the conveyor bridge and in bearing 11 on the lower portion 12 of the tower.

The stack is diminished by a unloading conveyor bridge 13 which is supported at its one end on the lower part of 12 of the tower, and rotating on the ground level to certain direction around the tower center 4. To the outer end of the unloading conveyor bridge 13 is mounted a driven support wheel assembly 15 that runs along a track 16 encircling the curved-top stockpile 3. While the embodiment of FIG. 1 uses a drag conveyor 14 as the unloading conveyor, alternatively an auger conveyor may be employed. The lower portion 12 of the tower having the unloading conveyor bridge 13 connected thereto by a pivot pin 18 is mounted in bearing 11 to the boom support portion 9 of the tower and in bearing 17 to a foundation frame 19 of the tower.

In the unloading conveyor bridge 13 is further adapted to include a rake-like lattice 20 which is adapted to move reciprocating along the bridge 13 and to collapse the stockpile 3 onto the unloading conveyor 14. The unloading conveyor transfers chips into a hopper 21, which is located around the bottom of the tower. The outer diameter of the annular opening is on the top 6 to 8 meters. The opening 24 diminishes below the tower to a funnel 21, from which the chips fall onto a conveyor 23 located in a tunnel 22 below the stockpile 3 and transferring chips away from the storage. The bottom 19 of the tower is supported on the ground foundation 26 by beams 25 crossing the opening 24.

Figure 2:
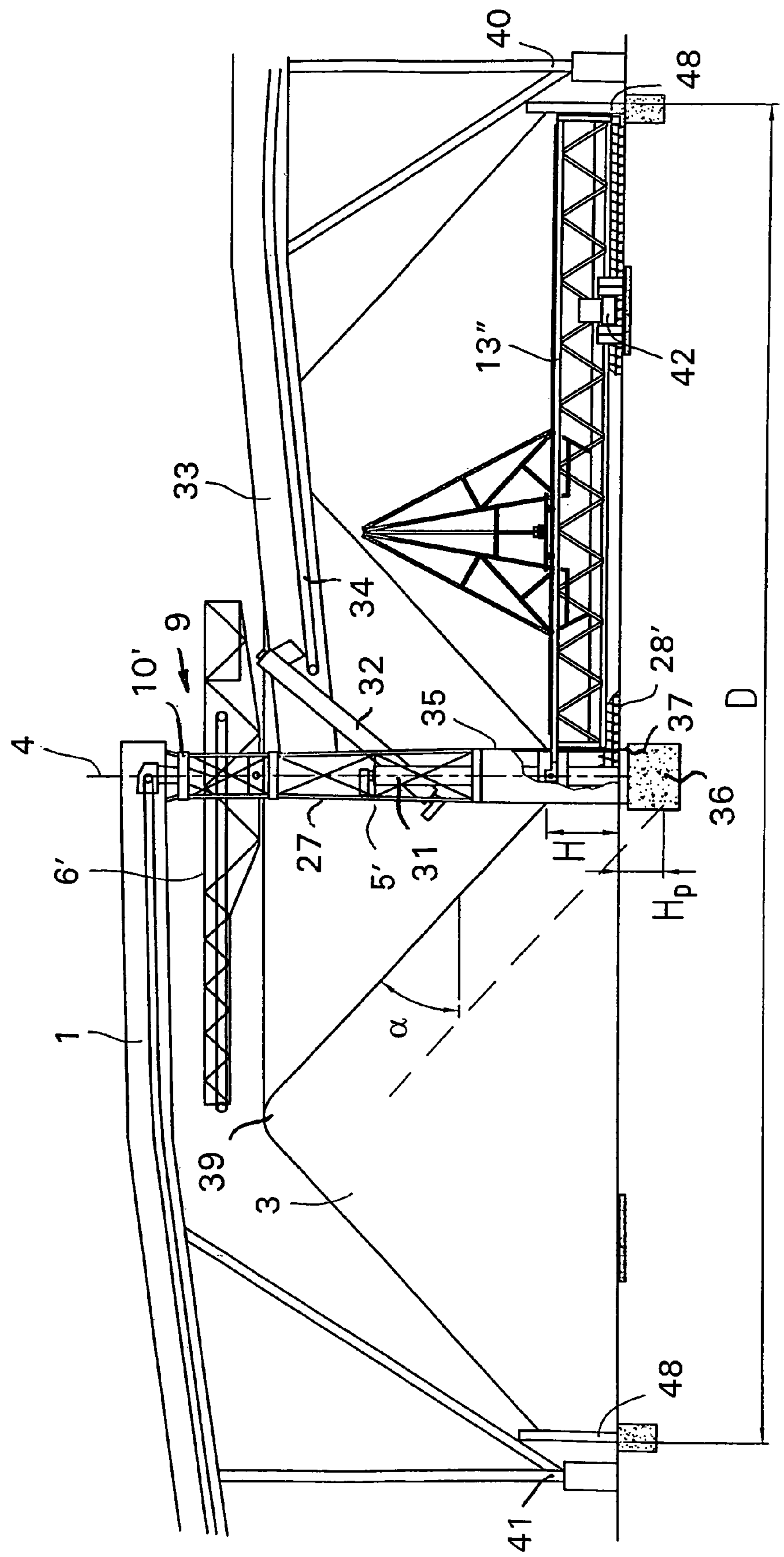

Now referring to FIG. 2, therein is shown one embodiment of a storage apparatus according to the present invention. The stockpile 3 is created in the same fashion as described above. An upper portion 9' of a tower is at its top end connected to the conveyor bridge in bearing 10'. The lower part of the upper portion 9' of the tower is mounted in bearing to a stationary middle portion 27 of the tower.

The unloading conveyor adapted to the unloading conveyor bridge 13" is shown to be an auger conveyor 28'. The unloading bridge is supported by a driven carriage 42 at a distance about ⅓ from the outer circle of the traveling path of the unloading bridge. The support forms a steady construction with moderate costs. Especially this is beneficial in connection with unloading bridges with a length of over 60 meters.

The unloading conveyor 28' feeds chips to a two-part vertical screw conveyor 31. The vertical screw conveyor 31 elevates chips onto an uphill-angled auger conveyor 32 that further transfers chips onto a belt conveyor 34 operating at a lower level on a bridge 33. Alternatively, the vertical screw conveyor 31 may be arranged to elevate chips directly onto the belt conveyor 34. It is beneficial of using a two-part vertical screw conveyor 31 in the invention because the lower portion 35 of the tower to rotate about the tower center 4 independently from the stationary middle portion 27 of the tower. The lower portion 35 of the tower is mounted to a foundation 36 in bearing 37 and to the stationary middle portion 27 of the tower in bearing 38.

The lower conveyor bridge 33 is attached to the stationary center portion 27 of the tower, wherefrom the conveyor bridge travels over the stockpile 3 or even tangentially to the top of the stockpile top 39, whereby the starting level of the chip transportation path from the storage is almost equal to the stockpile height. By way of orienting the lower 33 and the upper 1 conveyor bridges in different directions, the tower can be supported at its top from different directions by support feet 40 and 41 against wind forces imposed thereon.

Figure 3:
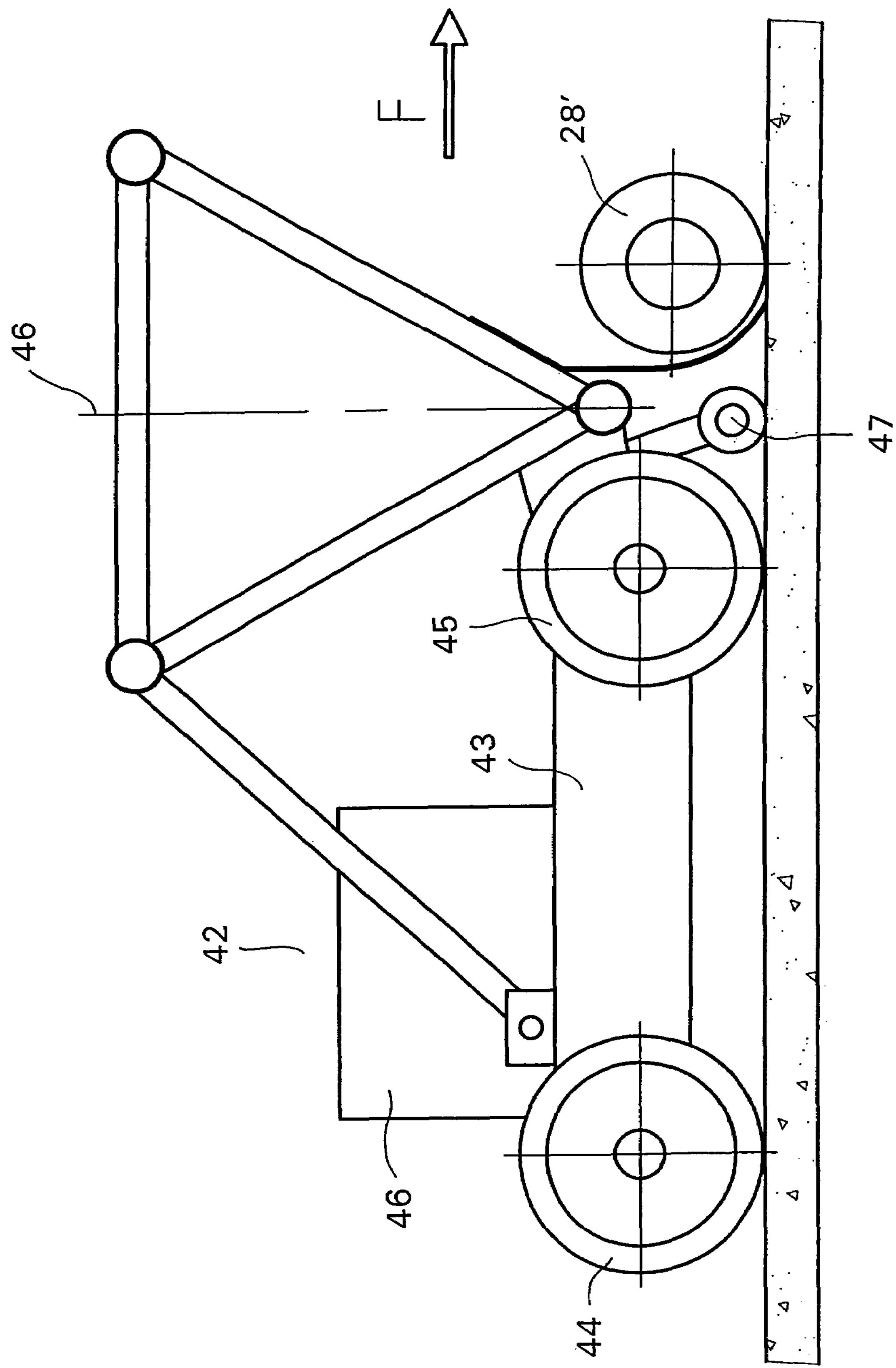

The carriage 42 disclosed more detailed on FIG. 3 consists of a carriage chassis 43, of wheels 44, 45 and of a counter-weight 46. The counter-weight is needed to balance the bridge 13", because the subsequent wheels 44, 45 of the carriage 42 are disposed on the same site from the balance point of the bridge 13". The balance point is in the vicinity of the middle point 46 of the bridge 13". The transport screw 28' is positioned on the opposite site of the bridge in respect to the carriage 42. An arrow F marks the moving direction of the bridge. A cleaning device 47 is assembled behind the screw 28' for brushing the travelling path of the wheels 44, 45.

When the unloading bridge 13" is furnished with the support carriage 42, the diameter D of the curved-top pile can be further diminished without limiting the storage volume by slightly increasing the pile height. This becomes possible when a wall 48 surrounding the pile is in use, as depicted in FIG. 2. In case the height of the wall is 2 meters, the outer diameter of the pile can be diminished by about 4 meters. Proper service doors are naturally to be included in the wall.

In an apparatus according to the invention, the inner perimeter of the stockpile can be allowed to rest against the tower up to a height H (most advantageously H is 2 to 4 m), as indicated in FIG. 2. Then, the lower portion of the tower is made from sheet plate at least up to the height H. A conventional apparatus construction has a discharge funnel made at the root of the tower, whereby H is smaller than zero meters (generally so that H is about −1 m), in FIG. 2 $H_p$. Assuming the stockpile envelope angle to be α, the stockpile can be moved closer to the tower center by a distance H/tan α. In the case of chip storage, this distance is about 4.5 meters. As a result, diameter D of the footprint required by the chip storage according to the present invention is 9 meters smaller than in conventional storage arrangements according to FIG. 1.

Due to the above mentioned measures resulting to a diminishing in the pile diameter the support beams 40, 41 for the transport bridges can be positioned closer to the center 4 of the pile. Consequently, lighter constructions in the bridges 1 and 33 are possible.

Figure 7:
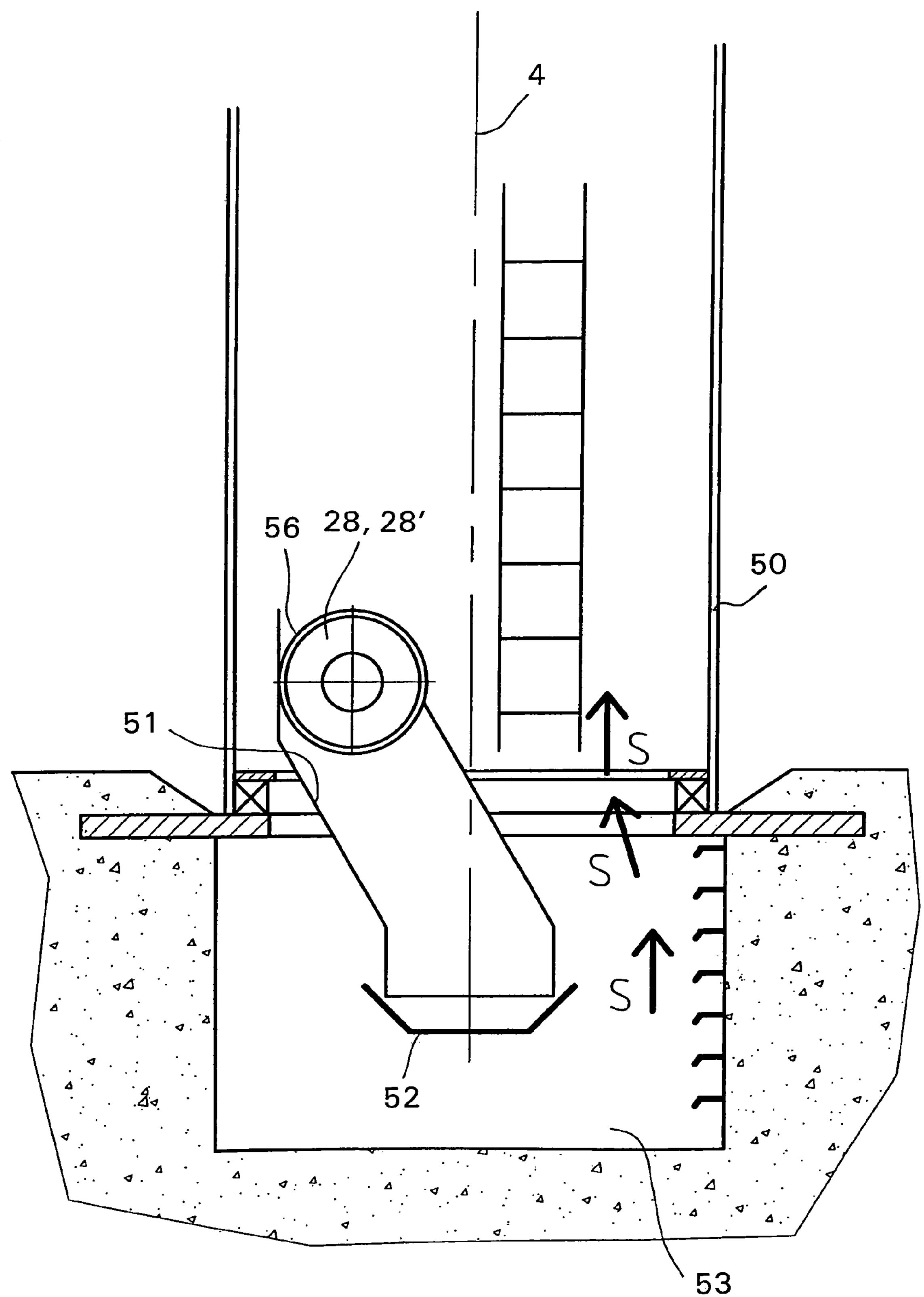
FIG. 7 illustrates an optional construction for discharging the chips from the storage.

Unloading of the chips from the pile, as depicted in FIG. 2, is arranged over the pile. An alternative embodiment is to use the under-pile transport 52, as depicted in FIG. 7. In either of the cases the material to be unloaded is transported inside of the mantle 50 of the tower, where it is directed either upwards or downwards.

Figure 4:
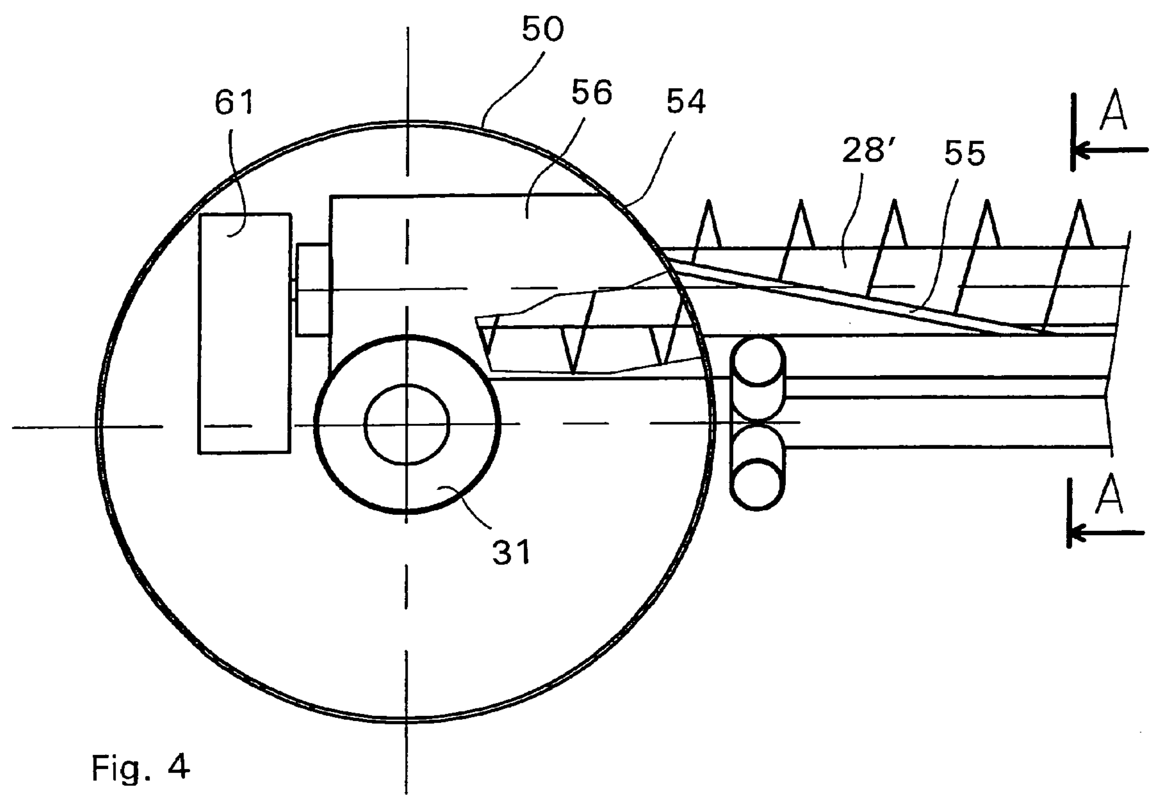
FIG. 4 illustrates a sectional view of the feet portion of the tower, seen from above.
Figure 5:
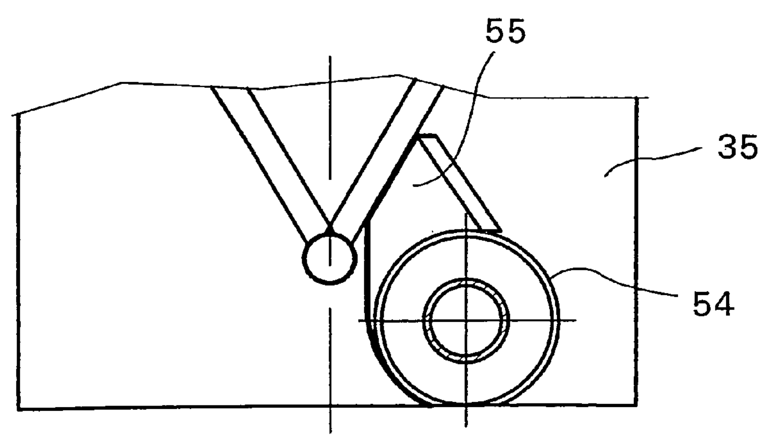
FIG. 5 is a sectional view A-A from FIG. 4 seen in upright position.

Drawing FIGS. 4 and 5 show the connection between the screw 28' and the lower portion 35 of the tower. The screw 28' is passed through an opening 54 in a, at least in its lower part contiguous mantle 50 of the lower portion 35 of the tower. The screw 28' transports the material along a guidance wall 55 towards the opening 54 in the tower mantle. Inside the mantle 50 the screw is surrounded by a screw chute 56, along which the material is transported to a lifting screw 31 positioned in the center of the tower.

When the support 42 for the unloading bridge 13" is used, the drive 61 for the screw 28' is positioned in the lower part 35 of the tower, inside the mantle 50.

Figure 6:
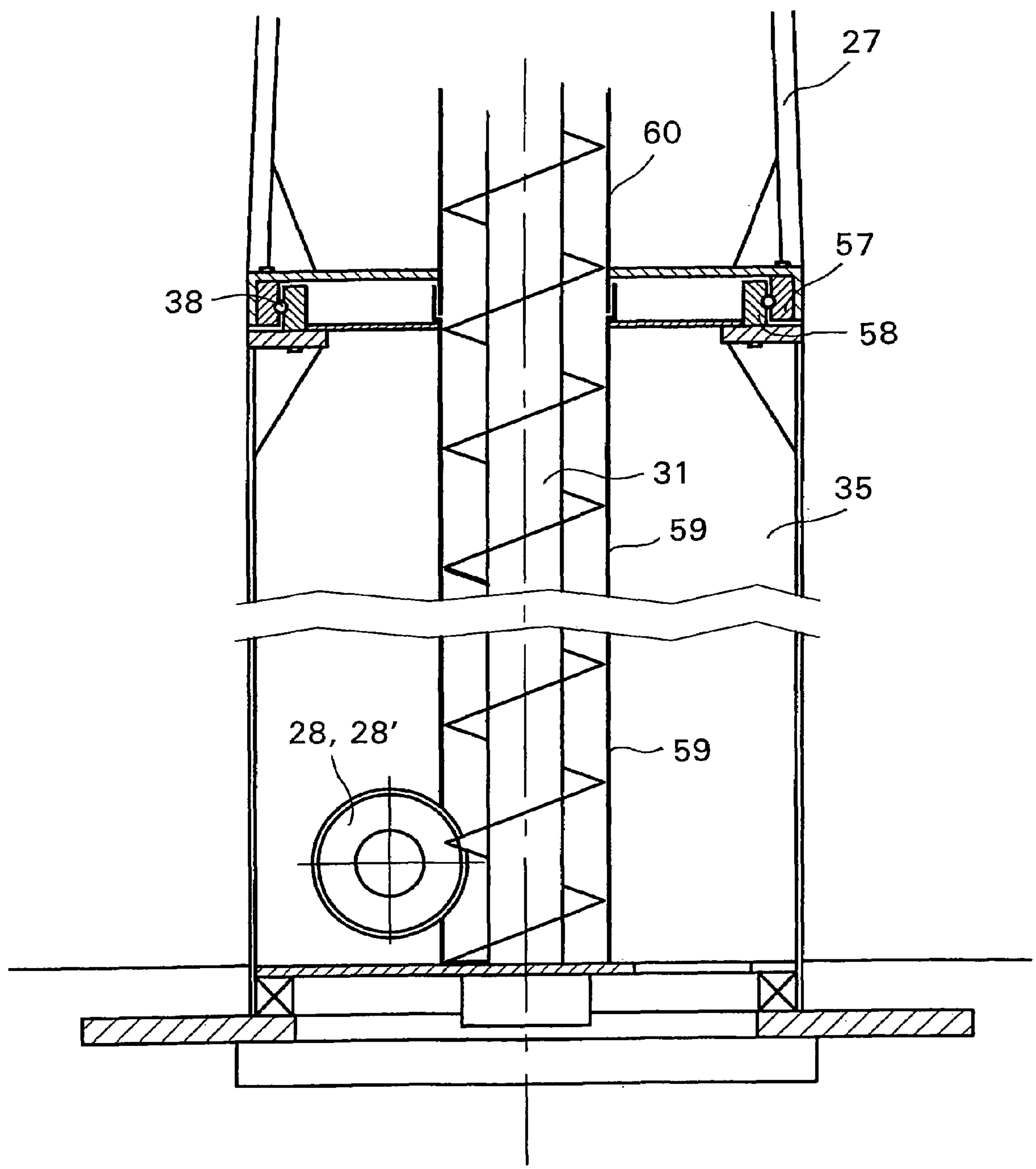
FIG. 6 illustrates the construction of the lifting conveyor.

The bearing construction 38 between the lower part 35 of the tower and the stationary middle part 27 is presented in the drawing FIG. 6. The outer ring 57 of the bearing is attached to the stationary middle part 27 of the tower, and the inner ring 58 is attached to the rotating lower part 35 of the tower. The mantle of the vertical screw 31 consists of two parts. The lower part 59 of the mantle is attached to the rotating lower part 35 of the tower and the parts rotate together along the unloading bridge 13', 13". The upper part 60 of the mantle is firmly supported on the stationary middle part 27 of the tower. It is important to center the halves of the mantle of the vertical screw 31, wherefor the halves can alternatively be connected by bearings to each other in order to avoid a radial mutual displacement of the halves.

What is claimed is:

1. An apparatus for storage of wood chips in a curved-top stockpile on a stockpile yard the apparatus consisting of a central tower, having a vertical central axes, a lifting conveyor occupied in the tower having consequent portions comprising; a top portion, an upper portion, a middle portion and a lower portion, the consequent portions being connected to each other so that the top portion is stationary, the upper portion is rotatable around the central axes, the middle portion is stationary and the lower portion is rotatable around the central axes, in which apparatus the top portion supports a conveyor for loading the chips, the upper portion supports a horizontally rotated conveyor said lifting conveyor for composing the chips received from the load conveyor to the pile, the middle portion supports a delivery conveyor for the chips from the lifting conveyor receiving the chips from a horizontal unloading device having a certain reach and supported at one end on the lower portion of the tower as well as within said certain reach on a driven carriage for movement around the tower, and being furnished with an unload drive, wherein said horizontal unloading device is supported on said lower portion of the tower firmly rotating therewith, and the stockpile yard is furnished with a wall at the reach of the unloading device.

2. The apparatus according to claim 1, wherein the horizontal unloading device is supported on the driven carriage at a distance of about ⅔ of the reach of the horizontal unloading device, and the unload drive of the unloading device is positioned inside the tower.

3. The apparatus according to claim 1, wherein the unloading devices include a guiding plate at said one end for directing the wood chips to an opening in the central tower.

4. The apparatus according to claim 1, wherein the lifting conveyor consists of a central tube in the tower, the tube having an upper part and a lower part and forming a mantle of a vertical screw conveyor, where the lower part is rotatable along the lower portion of the tower.

5. An apparatus for storage of wood chips in a curved-top stockpile on a stockpile yard the apparatus consisting of a central tower, having a vertical central axes, and several portions along said vertical axes the portions being journaled to allow an independent rotation around said vertical axes in respect to the adjacent portions, of which portions a top portion supports a conveyor for loading the chips, an upper portion supports a horizontally rotated conveyor for composing the chips received from the load conveyor to the stockpile, the lower portion supports a funnel receiving the chips from a horizontal unloading device having a certain reach and supported at one end on the lower portion of the tower as well as within said certain reach on a driven carriage for movement around the tower, the horizontal unloading device being furnished with an unload drive, wherein said horizontal unloading device is supported on said lower portion of the tower firmly rotating therewith, and the stockpile yard is furnished with a wall at the reach of the unloading device.

6. The apparatus according to claim 5, wherein the horizontal unloading device is supported on the driven carriage at a distance of about ⅔ of the reach of the horizontal unloading device, and the unload drive of the unloading device is positioned inside the tower.

7. The apparatus according to claim 5, wherein the unloading devices include a guiding plate at said one end for directing the wood chips to an opening in the central tower.

* * * * *